United States Patent [19]

King

[11] Patent Number: 4,646,097

[45] Date of Patent: Feb. 24, 1987

[54] OFF-CHANNEL FREQUENCY DISCRIMINATOR CIRCUIT FOR USE IN A PRECISION DISTANCE MEASURING EQUIPMENT (DME/P) RECEIVER

[75] Inventor: Dennis D. King, Sandy, Utah

[73] Assignee: E-Systems, Inc., Dallas, Tex.

[21] Appl. No.: 730,559

[22] Filed: May 6, 1985

[51] Int. Cl.$^4$ .............................................. G01S 1/08
[52] U.S. Cl. .................................... 342/95; 375/102; 455/303; 342/399; 342/407; 342/134; 342/45
[58] Field of Search .................... 343/399, 407, 6.5 R, 343/13 R, 7.3; 455/303, 311; 375/102

[56] References Cited

U.S. PATENT DOCUMENTS

| | | | |
|---|---|---|---|
| 3,495,244 | 2/1970 | La Rosa | 375/102 |
| 3,593,275 | 7/1971 | Pumpe | 375/102 |
| 3,621,401 | 11/1971 | Young, Jr. | 375/102 |
| 3,784,915 | 1/1974 | Oswald et al. | 364/574 |
| 3,870,993 | 3/1975 | Biagi et al. | 343/6.5 R |
| 3,953,802 | 4/1976 | Morris et al. | 375/102 |
| 3,988,679 | 10/1976 | Clarke et al. | 375/102 |
| 4,206,317 | 6/1980 | Kahn | 455/311 |
| 4,311,963 | 1/1982 | Watanabe et al. | 455/304 |

OTHER PUBLICATIONS

R. J. Kelly, System Considerations for the New DME/P International Standard, Jan. 1984, pp. 1-23, vol. AES-20, No. 1.

Primary Examiner—Theodore M. Blum
Assistant Examiner—David C. Cain
Attorney, Agent, or Firm—Albert M. Crowder, Jr.

[57] ABSTRACT

A precision distance measuring equipment (DME/P) receiver for detecting an RF signal including at least one interrogation pulse is described. The DME/P receiver includes first and second signal processing channels. The first processing channel includes a wideband filter, of bandwidth BW1, for receiving the processed RF signal and in response thereto generating a wideband (FA) mode signal proportional to the logarithm thereof. The second signal processing channel includes a narrowband filter, of bandwidth BW2, for receiving the processed RF signal and in response thereto generating a narrowband (IA) mode signal proportional to the logarithm thereof, the bandwidth BW2 of the narrowband filter being within the bandwidth BW1 of the wideband filter. A frequency discriminator circuit receives samples of the FA and IA mode signals from the first and second signal processing channels, and in response thereto generates a control signal when the pulse has a frequency within the bandwidth BW1 but outside the bandwidth BW2, the control signal representing an "off-channel" condition. In operation, gating circuits are connected to receive the control signal from the frequency discriminator circuit and operate to inhibit further processing of the FA and IA mode signals in the receiver during the "off-channel" condition.

15 Claims, 2 Drawing Figures

OFF-CHANNEL FREQUENCY DISCRIMINATOR CIRCUIT FOR USE IN A PRECISION DISTANCE MEASURING EQUIPMENT (DME/P) RECEIVER

TECHNICAL FIELD

The present invention relates to pulse type time-of-arrival detection systems and more particularly to an off-channel frequency discriminator circuit for use in a precision distance measuring equipment (DME/P) receiver.

BACKGROUND OF THE INVENTION

Microwave landing systems (MLS) facilitate aircraft approach and landing operations. Such systems include so-called precision distance measuring equipment (DME/P), which provides aircraft distance information by measuring total round-trip time between pulse-pair interrogations from an airborne transmitter and replies from a ground transponder. This type of system is capable of providing high accuracy ranging information in the severe multipath environment encountered during approach and landing operations.

In operation, a DME/P receiver located at the ground transponder receives a pulse-pair interrogation from an airborne transmitter. To enable the system to provide ranging information for a large number of aircraft, the system utilizes a plurality of channels allocated along a frequency spectrum. Each pulse-pair interrogation is normally assigned to a specific frequency channel, with each channel spaced approximately 1 MHz apart.

A proper response to the pulse-pair interrogation from a specific airborne transmitter requires a determination of the frequency of the pulse-pair. In the prior art, such frequency determinations have been made, for example, by a so-called "Ferris discriminator" circuit. This frequency discriminator circuit employs a narrowband filter, whose output detects the presence of an interrogation pulse, in combination with a wideband filter, whose output is gated only when there is also in coincidence a valid output from the narrowband filter. Thus in the Ferris discriminator, the output of the narrowband filter must exceed a predetermined output level of the wideband filter for a so-called "on-channel" condition to be declared. An "on-channel" condition indicates that the frequency of the received pulses is within the bandwidth of the narrowband filter.

A conventional DME/P receiver operates on logarithmically-detected video signals. The Ferris discriminator, however, operates on linearly-detected RF signals. It is therefore impractical to use a Ferris discriminator circuit in a DME/P receiver, because the on-channel determination provided by the Ferris circuit depends on the difference between two linear signals, and there is no equivalent for such signals in the logarithmic domain. Indeed, such use requires additional IF signal processing circuitry, which increases discriminator cost and complexity, and decreases overall system reliability. Moreover, at low input signal levels, receiver noise adversely affects operation of the Ferris discriminator circuit, thus further degrading receiver operation.

There is therefore a need to provide an improved frequency discriminator circuit which may be efficiently and economically used in the DME/P receiver of a microwave landing system.

BRIEF SUMMARY OF THE INVENTION

The present invention relates to a frequency discriminator circuit for use in a precision distance measuring equipment (DME/P) receiver. In contradistinction to prior art frequency discriminator circuits, which provide a so-called "on-channel" indication of the presence of a pulsed RF input signal inside a specified receiver bandwidth, the frequency discriminator circuit of the present invention provides an indication when the frequency of the pulsed RF input signal is within a first bandwidth BW1 but outside a second bandwidth BW2, where bandwidth BW2 is within bandwidth BW1. This operation generates a so-called "off-channel" signal, and represents system reception of DME/P input pulses that are not centered on the desired frequency of the receiver.

Moreover, according to another feature of the present invention, the off-channel information is derived from logarithmically-detected video signals already present in the DME/P receiver system, rather than linearly-detected IF signals, as in the prior art. This operation obviates complex and costly IF signal processing circuits required by prior art frequency discriminators.

In the preferred embodiment, a DME/P receiver for use in a pulse-type time-of-arrival detection system is described for detecting an RF signal including at least one interrogation pulse. The receiver includes a conventional mixing stage for receiving the RF signal and generating an IF signal. A first signal processing channel, including a wideband filter of bandwidth BW1, is provided for receiving the IF signal and in response thereto generating a wideband (FA) mode signal proportional to the logarithm of the IF signal output from the wideband filter. A second signal processing channel, including a narrowband filter of bandwidth BW2, is also provided for receiving the IF signal and in response thereto generating an narrowband (IA) mode signal proportional to the logarithm of the IF signal output from the narrowband filter, the bandwidth BW2 of the narrowband filter being within the bandwidth BW1 of the wideband filter. A frequency discriminator circuit is connected to receive samples of the FA and IA mode signals from the first and second signal processing channels, respectively, and in response thereto generates a control signal when the RF signal has a frequency within the bandwidth BW1 but outside the bandwidth BW2. This control signal represents the "off-channel" condition. The receiver also includes appropriate gating circuits, connected to receive the control signal from the frequency discriminator circuit, for inhibiting further processing of the FA and IA mode signals in the receiver during the off-channel condition.

The off-channel frequency discriminator circuit of the present invention therefore operates in an opposite sense as compared to prior art discriminator circuits, providing an indication when a received signal is off-channel, but not when the received signal is within the desired bandwidth of the receiver. When used in a DME/P receiver, the frequency discriminator circuit of the present invention provides improved performance over prior art circuits at less complexity and cost, and results in no appreciable degradation of receiver efficiency at low input signal levels.

BRIEF DESCRIPTION OF THE DRAWINGS

For a more complete understanding of the present invention, reference is now made to the following Description taken in conjunction with the accompanying Drawings in which.

DETAILED DESCRIPTION

Figure 1:
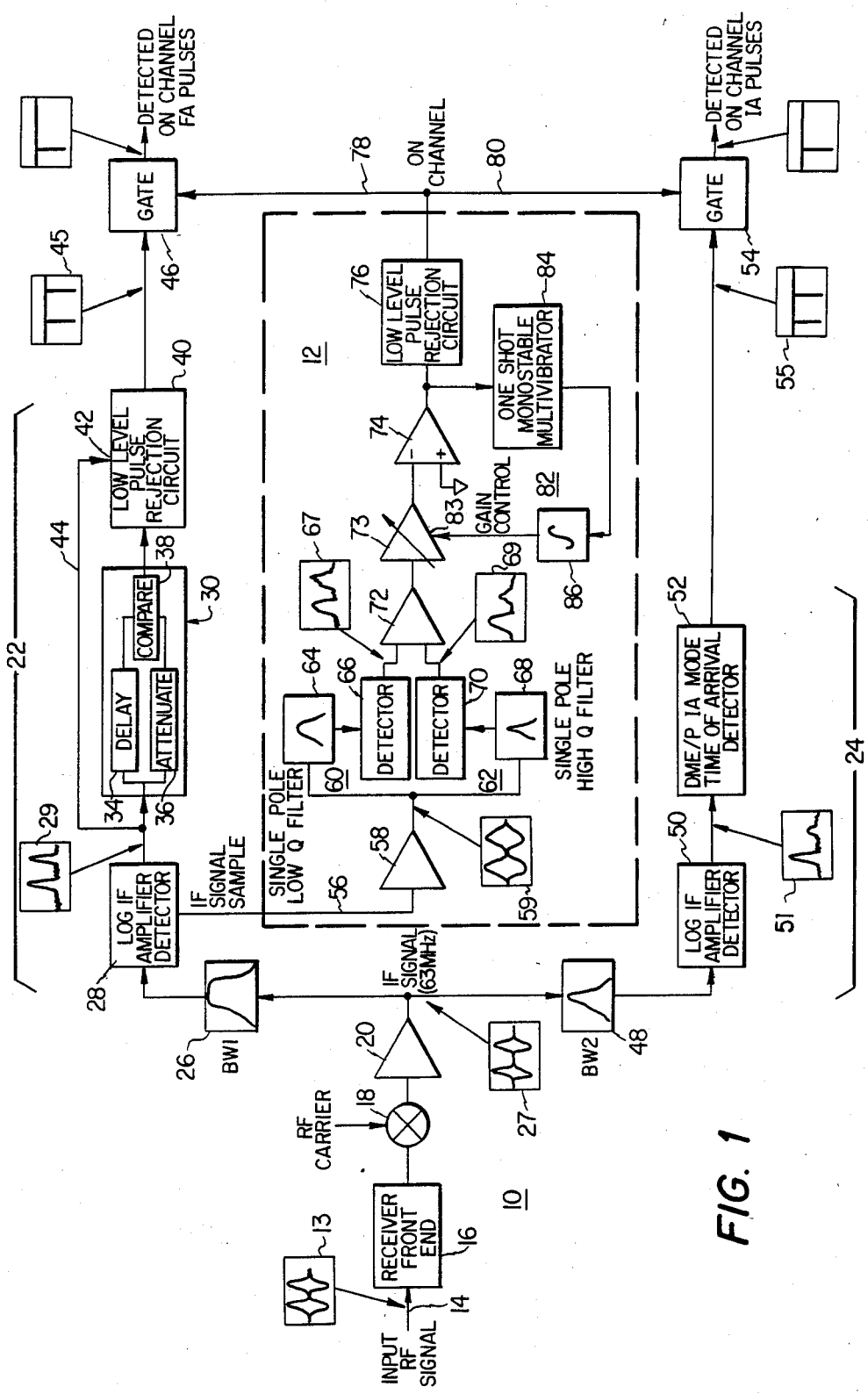
FIG. 1 is a block diagram of a prior art precision distance measuring equipment (DME/P) receiver incorporating a Ferris discriminator circuit.

Referring now to the Figures, wherein like reference characters designate like or similar elements throughout the several views, FIG. 1 is a block diagram of a prior art precision distance measuring equipment (DME/P) receiver 10, which incorporates a frequency discriminator circuit of the Ferris type, designated generally by the reference numeral 12. The DME/P receiver 10 receives an RF signal 13 on line 14, which is applied to conventional receiver front end circuitry 16 for initial signal processing. The RF signal input on line 14 preferably includes a pair of interrogation pulses for facilitating aircraft range determination. Each interrogation pulse is normally approximated by a $\cos^2/\cos^2$ envelope.

The output of the receiver front end circuitry 16 is applied to one input of a mixer 18, the other input thereto being an RF carrier signal. The mixer 18 translates the RF input signal to IF, preferably 63 MHz, and the output thereof is amplified in amplifier 20 and applied directly to two parallel signal processing channels, 22 and 24. The first signal processing channel 22 provides a so-called wideband final approach (FA) mode of operation, while the second signal processing channel 24 provides a so-called narrowband initial approach (IA) mode of operation.

Specifically, the DME/P receiver 10 of FIG. 1 operates in a two-pulse/two-mode fashion. The wideband final approach (FA) mode is utilized for aircraft ranges up to seven (7) nautical miles from the transponder, which satisfies adjacent channel power constraints on the transponder while maintaining adequate receiver threshold-to-noise ratio. When the aircraft is between seven (7) and twenty-two (22) nautical miles from the transponder, however, the narrowband initial approach (IA) mode is used. The proper interrogation mode is determined by the transponder through an interrogation code, with transponder reply delay timing based on the proper threshold point for the type of interrogation received. In the region between seven (7) and eight (8) nautical miles from the transponder, an approaching aircraft interrogator transmits in both the IA and FA modes to effect a smooth transition to the FA mode by the time the aircraft reaches the seven (7) nautical mile point. The first and second signal processing channels 22 and 24 are provided to facilitate processing of the received RF signal during the FA and IA operational modes.

Referring back to FIG. 1, the first signal processing channel 22 includes a multipole wideband bandpass filter 26, of bandwidth BW1, for filtering an IF signal 27 produced by the amplifier 20. The output of filter 26 is applied to a logarithmic IF amplifier/detector 28, which generates a wideband (FA) mode signal 29. As is known in the art, a logarithmic amplifier generates an output which is a logarithmic (as opposed to linear) function of its input, and thus the FA mode signal 29 is proportional to the logarithm of the signal output from filter 26. The FA mode signal 29 is then fed to a time-of-arrival (TOA) detector 30, which creates logic pulses corresponding with the time-of-arrival of each pulse at the receiver 10. In the preferred embodiment, the time-of-arrival detector 30 includes a delay, attenuate, and compare circuit (DAC) comprising delay network 34, attenuate network 36, and a compare network 38. In operation, compare network 38 compares a delayed version of each pulse generated by the delay network 34, to an attenuated version of the same pulse generated by the attenuate network 36. The attenuate network 36 comprises a subtraction circuit because in the logarithmic domain subtraction of a logarithmic signal is equivalent to attenuation of a linear signal. Pulse arrival is declared when the amplitude of the delayed version exceeds the amplitude of the attenuated version by a predetermined amount.

The output of the time-of-arrival detector 30 is then applied to a low level pulse rejection circuit 40, whose threshold level is determined by the logarithmic video waveform applied to a control terminal 42 thereof via line 44. The low level pulse rejection circuit 40, which is described in copending application titled "Method and Apparatus for Generating a Timing Signal in a Time-of-Arrival Detection System," Ser. No. 730,560, filed May 6, 1985, eliminates time-of-arrival detector outputs from the time-of-arrival detector 30 due to receiver noise. The output 45 of the low level pulse rejection circuit 40 is then applied to a gate circuit 46, control of which is effected by the frequency discriminator circuit 12, as will be described below.

The second signal processing path 24 of the DME/P receiver 10 includes a multipole narrowband filter 48, of bandwidth BW2, for filtering the IF signal 27 from amplifier 20, the bandwidth BW2 of the narrowband filter 48 being within the bandwidth BW1 of the wideband filter 26. The output of the filter 48 is fed to a logarithmic IF amplifier/detector 50 which generates a narrowband (IA) mode signal 51 proportional to the logarithm of the signal output from the filter 48. The IA mode signal output generated by the logarithmic IF amplifier/detector 50 is applied to an IA mode time-of-arrival detector 52. Detector 52 preferably includes a well-known peak-amplitude-find (PAF) circuit for generating logic pulses corresponding with the time-of-arrival of each pulse at the receiver 10. Specifically, the PAF circuit determines pulse time-of-arrival by comparing a peak level of the IA mode signal 51 with an attenuated version of this signal generated in circuit 52. The output 55 of the time-of-arrival detector 52 is applied to a gate circuit 54, the control of which is also effected by the frequency discriminator circuit 12 as will be described.

The logical detected pulses output from the time-of-arrival detectors 30 and 52 are gated on or off depending on the output of the Ferris discriminator circuit 12 at each particular instant of operation. Specifically, samples of the IF signal generated by the logarithmic IF amplifier/detector 28 in the first signal processing channel 22 are diverted to the Ferris discriminator circuit 12 via line 56. Discriminator circuit 12 includes a linear IF amplifier 58 for amplifying the signal samples applied thereto. The output 59 of the amplifier 58 is then applied to parallel processing paths 60 and 62 of the discriminator circuit 12.

The first parallel processing path 60 of the discriminator includes a single pole low quality factor (Q) filter 64 and a linear detector 66, while the second parallel processing path 62 thereof includes a single pole high Q filter 68 and the linear detector 70. Preferably, the filter 68 in the second processing path 62 has a bandwidth within the bandwidth of filter 64 and exhibits a bandwidth of approximately 400 kHz. The outputs 67 and 69 of the first and second parallel processing paths 60 and 62 are differenced in a difference amplifier 72, and applied to the inverting input terminal of a comparator 74 through a variable gain amplifier 76. If the amplitude of the linearly-detected signal output from the high Q filter 68 is larger than the amplitude of the signal output from the low Q filter 64, then the output of the difference amplifier 72 is considered "on-channel." In this case, the output of the comparator 74 is used to open the FA and IA mode gates 46 and 54, respectively. Specifically, the output of the comparator 74 is first applied to a low level pulse rejection circuit 76, which reduces the noise components generated by the frequency discriminator circuit 12. The output of the pulse rejection circuit 76 is applied via lines 78 and 80 to the gates 46 and 54, respectively, to allow the pulses output from the time-of-arrival detectors 30 and 52 to be processed in the remainder of the receiver 10.

As also seen in FIG. 1, the Ferris discriminator circuit 12 includes a feedback circuit 82, connected between the output of the comparator 74 and a control terminal 83 of the variable gain amplifier 76, to maintain a constant number of noise-initiated zero crossings at the output of comparator 74, thereby maintaining the discriminator sensitivity at the highest possible level. The feedback circuit 82 includes a monostable multivibrator 84 for receiving the output of the comparator 74. The output of the monostable multivibrator 84 is applied to an integrator 86, which generates a DC level control voltage for controlling, via control terminal 83, the gain of variable gain amplifier 76.

The DME/P receiver 10 of FIG. 1 is inefficient because receiver noise adversely affects the Ferris frequency discrimination operation, especially at low input signal levels. Specifically, the "on-channel" indication generated by the discriminator circuit must be produced at the lowest RF input levels specified for the receiver system. Receiver noise is usually present at these low input levels within a order of magnitude of the level of the received pulse signals. Since pulse reception is accomplished only with successful frequency discriminator operation, such receiver noise results in an increased number of improper pulse detections, thereby reducing receiver efficiency.

Moreover, the use of a Ferris discriminator circuit 12 in the precision distance measuring equipment (DME/P) receiver 10 of FIG. 1 is impractical. In particular, the Ferris circuit 12 is normally designed to operate on linearly-amplified signals, whereas the DME/P receiver produces logarithmic video signals at the outputs of detector circuits 28 and 50. Such logarithmic signals are incompatible with the Ferris circuit because the frequency determination provided thereby depends on the difference between two linear signals, specifically, the signals output from detectors 66 and 70, and there is no equivalent of such signals in the logarithmic domain. Accordingly, the circuit of FIG. 1 requires additional IF signal processing capability, thus increasing the complexity and cost of the receiver, and decreasing overall system reliability.

These and other problems of the prior art are overcome by the present invention, which relates to an off-channel frequency discriminator circuit for use in a precision distance measuring equipment (DME/P) receiver. Specifically, and with reference to FIG. 2, in the preferred embodiment of the invention the DME/P receiver 10 includes the same elements as described above with respect to FIG. 1. In order to provide improved performance over the prior art, however, especially at low input signal levels, the present invention replaces the Ferris discriminator circuit 12 of FIG. 1 with an "off-channel" frequency discriminator circuit, designated in FIG. 2 by the reference numeral 100. As used herein, the term "off-channel" reflects that the frequency discriminator circuit 100 operates to inhibit passage of the processed RF signal when this signal has a frequency inside the bandwidth BW1 of filter 26 in the first signal processing channel 22, but outside the bandwidth BW2 of filter 48 in the second signal processing channel 24.

In operation, the FA and IA mode logarithmically-detected video signals produced by the logarithmic IF amplifier/detectors 28 and 50 are processed by the frequency discriminator 100 to determine if the RF input signal is off-channel. Specifically, samples of the FA and IA mode signals 31 and 51 are transferred via lines 102 and 104 to a video difference amplifier 106 in the discriminator circuit 100. If the FA mode logarithmic video signal 31 generated by the logarithmic IF amplifier/detector 28 is larger in level than the IA mode logarithmic video signal 53 generated by the logarithmic IF amplifier/detector 50, then a difference signal 107 is generated at the output of the video difference amplifier 106. Difference signal 107 is coupled via capacitor 108 to a low pass filter 109 comprising resistor 110 and capacitor 112. Low pass filter 109 reduces the noise content in the output of the video difference amplifier 78. The output 113 of the low pass filter 108 is applied to an inverting input of a comparator 114, the non-inverting input thereto being connected to ground. Any difference in the levels between the signals 31 and 51 applied to the video difference amplifier 106 is detected by the comparator 114, and produces a control voltage at the comparator output. The control voltage output from comparator 114 is applied to a noise pulse rejection circuit 116, which eliminates responses caused by receiver noise. The output of the noise pulse rejection circuit 116 is applied to a monostable multivibrator 118, which in response thereto generates an "off-channel" control signal 119 at the output thereof.

Figure 2:
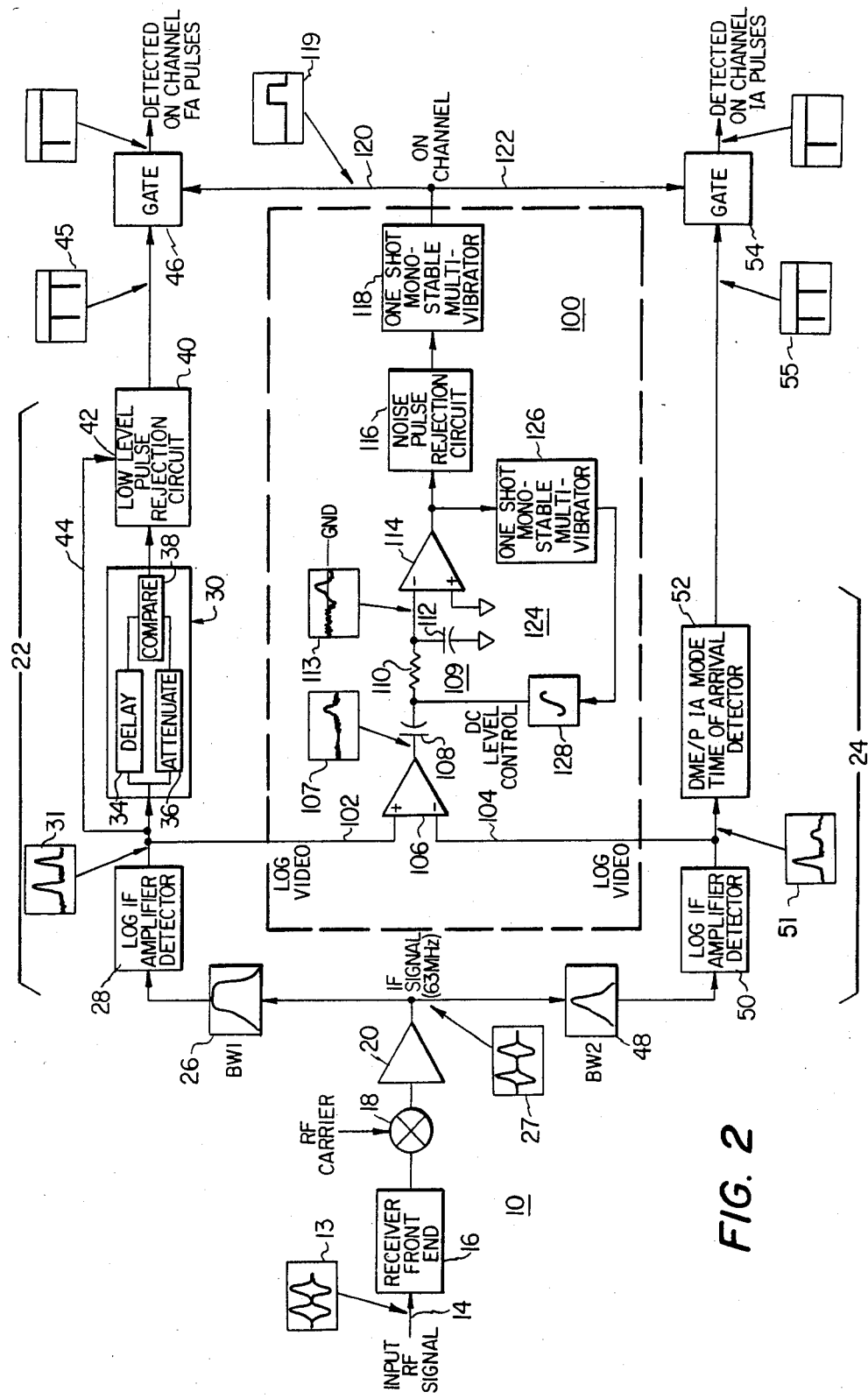
FIG. 2 is a block diagram of the DME/P receiver of FIG. 1 incorporating an off-channel frequency discriminator circuit according to the teachings of the present invention.

The off-channel control signal 119 is applied via lines 120 and 122 to control gates 46 and 54 of the first and second signal processing paths 22 and 24, respectively. The control signal 119 serves to inhibit passage of any detected pulses in signals 31 and 51 that are off-channel. For example, as seen in FIG. 2 the representation of the IA mode signal 51 includes two pulses, with the second of these pulses having a relatively small amplitude. This second pulse is "off-channel." Accordingly, the second detected pulse in signal 55, which is output from DAC detector 52 and corresponds to the "off-channel" pulse, is not passed through gate 54 by the operation of the frequency discriminator circuit 100 as described above. On-channel pulses, i.e., those pulses within the bandwidth BW2 of the narrowband filter 48 in the second signal processing path 22, create no difference signal 107 at the output of the video difference amplifier 106, and thus no output is produced from the comparator 114 or monostable multivibrator 119.

The frequency discriminator circuit 100 also includes a feedback circuit 124 to count the number of noise outputs from the comparator 114. Feedback circuit 124 comprises a monostable multivibrator 126, which is triggered by the output of the comparator 114. The output of the monostable multivibrator 126 is summed over a predetermined time period by an integrator 128, which in response thereto produces a DC level control voltage at the input of the low pass filter 108. The feedback circuit 124 adjusts the DC level at the inverting input of the comparator 114 to maintain a constant number of noise-initiatd zero crossings per second. Feedback circuit 124 thus maintains the comparator 114 at the optimum sensitivity.

Therefore, in contradistinction to prior art frequency discrimination methods, the present invention generates an "off-channel" signal in response to DME/P input pulses that are not centered on the desired received frequency. As discussed above, such prior art approaches, e.g., as shown in the receiver of FIG. 1, produce an "on-channel" indication in response to received signals within a specified frequency bandwidth determined by the filtering elements in the Ferris Discriminator. The generation of an "off-channel" signal by the frequency discriminator circuit 100 of FIG. 2 is advantageous because it allows the reply efficiency of very low level signals to be unaffected by the discriminator operation; while in the case of the prior art, the discriminator had to be operating extremely well at such levels to produce an accurate "on-channel" indication. This is because in the embodiment of FIG. 2, even if the signal level is small, the bandwidth of the narrowband filter BW2 in the second signal processing path 24 is narrow enough to preclude IA mode detection of the off-channel signal.

The frequency discriminator circuit 100 of FIG. 2 is also advantageous because all of the off-channel discrimination is performed on logarithmically-detected video signals already present in the DME/P receiver 10. As discussed above with respect to FIG. 1, prior art frequency discriminator circuits operate on linearly-detected signals, and thus complex and expensive IF signal processing is required prior to the frequency discriminator operation. The present invention obviates such additional IF signal processing and takes advantage of the logarithmic IA and FA mode signals already present in the DME/P receiver to produce the "off-channel" indication. Thus, the discriminator circuit 100 does not require the IF amplifier 58 shown in FIG. 1, nor the additional pair of filters 64 and 68. Indeed, because the DME/P receiver 10 produces logarithmic video-detected signals, the off-channel frequency discriminator of FIG. 2 can be added to the basic DME/P receiver by the addition of only video frequency circuits, resulting in lower additional costs and complexity as compared to a Ferris Discriminator circuit of FIG. 1.

Although the invention has been described in detail, it is to be clearly understood that the same is by of illustration and example only and is not to be taken by way of limitation, the spirit and scope of the invention being limited only to the terms of the appended claims.

I claim:

1. A precision distance measuring equipment (DME/P) receiver for use in a pulse-type time-of-arrival detection system for detecting an RF signal including at least one pulse, comprising:

means for receiving said RF signal and in response thereto generating an IF signal;

first signal processing means including a wideband filter, of bandwidth BW1, for receiving said IF signal and in response thereto generating a wideband (FA) mode signal proportional to the logarithm of said IF signal as filtered by the wideband filter;

second signal processing means including a narrowband filter, of bandwidth BW2, for receiving said IF signal and in response thereto generating a narrowband (IA) mode signal proportional to the logarithm of said IF signal as filtered by the narrowband filter, the bandwidth BW2 of said narrowband filter being within the bandwidth BW1 of said wideband filter;

discriminator means for receiving said FA and IA mode signals from said first and second signal processing means, respectively, and in response thereto generating a control signal when said pulse has a frequency within said bandwidth BW1 but outside said bandwidth BW2, said control signal representing an "off-channel" condition; and gating means for receiving said control signal from said discriminator means, and in response thereto inhibiting further processing of said FA and IA mode signals in said receiver during said off-channel condition.

2. The precision distance measuring equipment (DME/P) receiver as described in claim 1 wherein said discriminator means comprises:

means for differencing said FA and IA mode signals and in response thereto generating a difference signal if said FA mode signal has a signal characteristic greater in magnitude than said IA mode signal;

means for comparing said difference signal with a reference signal to generate a control voltage; and means for reciving said control voltage and in response thereto generating said control signal.

3. The precision distance measuring equipment (DME/P) receiver as described in claim 2 wherein said discriminator means further includes:

means, connected between said differencing means and said comparing means, for filtering said difference signal to reduce noise components therein; and means connected between an output of said comparing means and an input of said filtering means, for counting noise outputs from said comparing means due to said noise components, and in response thereto adjusting the level of said difference signal.

4. The precision distance measuring equipment (DME/P) receiver as described in claim 2 wherein said discriminator means further includes means, connected between said comparing means and said receiving means, for minimizing said noise components.

5. The precision distance measuring equipment (DME/P) receiver as described in claim 1 wherein said first and second signal processing means each include an IF logarithmic amplifier/detector circuit for generating said FA and IA mode signals.

6. The precision distance measuring equipment (DME/P) receiver as described in claim 1 further including first time-of-arrival detector means connected to said first signal processing means for receiving said FA mode signal and in response thereto generating an FA mode time-of-arrival signal representing the time-of-arrival of said pulse in said RF signal.

7. The precision distance measuring equipment (DME/P) receiver as described in claim 6 wherein said first time-of-arrival detector means includes a delay-attenaute-compare circuit for comparing a delayed version of said FA mode signal with an attenuated version of said FA mode signal to generate said FA mode time-of-arrival signal.

8. The precision distance measuring equipment (DME/P) receiver as described in claim 1 wherein said receiver further includes second time-of-arrival means connected to said second signal processing means for receiving said IA mode signal and in response thereto generating an IA mode time-of-arrival signal representing the time-of-arrival of said pulse in said RF signal.

9. The precision distance measuring equipment (DME/P) receiver as described in claim 8 wherein said second time-of-arrival detector means includes a peak-amplitude-find circuit for comparing a peak level of said IA mode signal with an attenuated version of said IA mode signal to generate said IA mode time-of-arrival signal.

10. A precision distance measuring equipment (DME/P) receiver for use in a pulse-type time-of-arrival detection system for detecting an RF signal including a pulse pair interrogation, comprising:
   a mixer for receiving said RF signal and in response thereto generating an IF signal;
   a first signal processing channel including a wideband filter, of bandwidth BW1, and a logarithmic amplifier/detector, for receiving said IF signal and in response thereto generating a wideband (FA) mode signal proportional to the logarithm of said IF signal as filtered by the wideband filter;
   a second signal processing channel including a narrowband filter, of bandwidth BW2, and a logarithmic amplifier/detector, for receiving said IF signal and in response thereto generating a narrowband (IA) mode signal proportional to the logarithm of the IF signal as filtered by the narrowband filter, the bandwidth BW2 of said narrowband filter being within the bandwidth BW1 of said wideband filter;
   said first signal processing channel also including a time-of-arrival detector circuit connected to said logarithmic amplifier/detector therein for receiving said FA mode signal and in respone thereto generating an FA mode time-of-arrival signal representing the time-of-arrival of said pulse pair interrogation;
   said second signal processing channel also including a time-of-arrival detector circuit connected to said logarithmic amplifier/detector therein receiving said IA mode signal and in response thereto generating an IA mode time-of-arrival signal representing the time-of-arrival of said pulse pair interrogation;
   a frequency discriminator circuit for receiving said FA and IA mode signals from said first and second logarithmic amplifier/detectors, respectively, and in response thereto generating a control signal when either of the pulses in said pulse pair interrogation has a frequency within said bandwidth BW1 but outside bandwidth BW2, said control signal representing an "off-channel" condition; and
   a pair of gate circuits connected to said time-of-arrival detector circuits, for receiving said control signal from said frequency discriminator circuit and in response thereto inhibiting further processing of said FA and IA mode signals in said receiver during said "off-channel" condition.

11. The precision distance measuring equipment (DME/P) receiver as described in claim 10 wherein said frequency discriminator circuit comprises:
   a video difference amplifier for differencing said FA and IA mode signals and in response thereto generating a difference signal if said FA mode signal has an amplitude greater than an amplitude of said IA signal;
   a low pass filter connected to said video difference amplifier for filtering said difference signal to reduce noise components therein;
   a comparator connected to said low-pass filter for comparing said filtered difference signal with a reference voltage and in response thereto generating a control voltage;
   a monostable multivibrator for receiving said control voltage and in response thereto generating said control signal; and
   a feedback circuit connected between an output of said comparator and an input of said low pass filter for counting noise outputs from said comparator due to said noise components, and in response thereto adjusting the level of said difference signal.

12. The precision distance measuring equipment (DME/P) receiver as described in claim 11 wherein said frequency discriminator circuit further includes a noise pulse rejection circuit, connected between said comparator and said monostable multivibrator, for minimizing said noise components.

13. The precision distance measuring equipment (DME/P) receiver as described in claim 11 wherein said feedback circuit includes a monostable multivibrator triggered by said control voltage, and an integrator for generating a DC control voltage for adjusting said level of said difference signal.

14. The precision distance measuring equipment (DME/P) receiver as described in claim 10 wherein said first time-of-arrival detector circuit comprises a delay-attenuate-compare (DAC) circuit, and said second time-of-arrival detector comprises a peak-amplitude-find (PAF) circuit.

15. A method for detecting an RF signal including at least one pulse, comprising the steps of:
   receiving said RF signal and in response thereto generating an IF signal;
   processing said IF signal in a first signal processing channel including a wideband filter, of bandwidth BW1, to generate a wideband (FA) mode signal proportional to the logarithm of said IF signal as filtered by said wideband filter;
   processing said IF signal in a second signal processing channel including a narrowband filter, of bandwidth BW2, to generate a narrowband (IA) mode signal proportional to the logarithm of said IF signal as filtered by said narrowband filter, the bandwidth BW2 of said narrowband filter being within the bandwidth BW1 of said wideband filter;
   differencing said FA and IA mode signals generated in said first and second signal processing channels, and in response thereto providing a control signal when said pulse has a frequency within the bandwidth BW1 but outside the bandwidth BW2, said control signal representing an "off-channel" condition; and
   in response to said control signal, inhibiting further processing of said FA and IA mode signals during said "off-channel" condition.

* * * * *